US010503820B2

(12) United States Patent
Duggan et al.

(10) Patent No.: US 10,503,820 B2
(45) Date of Patent: Dec. 10, 2019

(54) MAP NOTES

(71) Applicant: Microsoft Technology Licensing, LLC, Redmond, WA (US)

(72) Inventors: Finbarr Duggan, County Wicklow (IE); David Grochocki, Jr., Seattle, WA (US); Jeff West, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 317 days.

(21) Appl. No.: 15/176,066

(22) Filed: Jun. 7, 2016

(65) Prior Publication Data
US 2017/0277671 A1 Sep. 28, 2017

Related U.S. Application Data

(60) Provisional application No. 62/314,288, filed on Mar. 28, 2016.

(51) Int. Cl.
*G06F 17/24* (2006.01)
*G06F 3/0484* (2013.01)
*G06T 3/60* (2006.01)
*G06F 3/0482* (2013.01)
*G06F 3/0481* (2013.01)
(Continued)

(52) U.S. Cl.
CPC ....... *G06F 17/241* (2013.01); *G01C 21/3632* (2013.01); *G01C 21/3667* (2013.01); *G06F 3/0481* (2013.01); *G06F 3/0482* (2013.01); *G06F 3/04842* (2013.01); *G06F 16/29* (2019.01); *G06F 16/9537* (2019.01);
(Continued)

(58) Field of Classification Search
CPC ..................................................... G04F 17/241
USPC ......................................................... 715/232
See application file for complete search history.

(56) References Cited

U.S. PATENT DOCUMENTS 6,061,688 A 5/2000 Kilpatrick et al.
7,945,852 B1 5/2011 Pilskalns
(Continued)

OTHER PUBLICATIONS

ISA European Patent Office, International Search Report and Written Opinion Issued in PCT Application No. PCT/US2017/023502, dated Jul. 12, 2017, WIPO, 11 Pages.
(Continued)

*Primary Examiner* — Shawn S Joseph
(74) *Attorney, Agent, or Firm* — Alleman Hall Creasman & Tuttle LLP

(57) ABSTRACT

A computing device includes a display, a logic machine, and a storage machine holding instructions executable to display a map via the display, and associate a note with location data defining a geographic location. The note is associated with an annotation displayable on the map. The annotation is associated with a location parameter defining a map location at which the annotation is displayed on the map corresponding to the geographic location associated with the note. The annotation is associated with a zoom parameter defining one or more Map zoom levels at which the annotation is displayed on the map. The annotation is associated with a context parameter defining one or more computing device contexts with which the annotation is displayed on the map. A notification corresponding to the note is presented based on the computing device being located within a threshold distance of the geographic location.

20 Claims, 13 Drawing Sheets

(51) Int. Cl.
*G01C 21/36* (2006.01)
*G06F 16/29* (2019.01)
*G06F 16/9537* (2019.01)

(52) U.S. Cl.
CPC .............. *G06F 17/242* (2013.01); *G06T 3/60* (2013.01); *G06F 2203/04806* (2013.01)

(56) References Cited

U.S. PATENT DOCUMENTS

| | | |
|---|---|---|
| 8,122,024 B2 | 2/2012 | Tysowski |
| 8,185,601 B2 | 5/2012 | Rauhala et al. |
| 8,749,585 B2 | 6/2014 | Kinnan et al. |
| 2006/0058949 A1 | 3/2006 | Fogel et al. |
| 2007/0288164 A1 | 12/2007 | Gordon et al. |
| 2009/0132941 A1 | 5/2009 | Pilskalns et al. |
| 2010/0241623 A1 | 9/2010 | Acker et al. |
| 2011/0096091 A1 | 4/2011 | Milewski et al. |
| 2011/0320114 A1 | 12/2011 | Buxton et al. |
| 2012/0124461 A1 | 5/2012 | Barnett et al. |
| 2013/0225236 A1 | 8/2013 | Lee et al. |
| 2014/0089776 A1 | 3/2014 | Pilskalns |
| 2014/0267796 A1 | 9/2014 | Jang et al. |
| 2014/0365901 A1 | 12/2014 | Moha et al. |
| 2015/0169524 A1 | 6/2015 | Dayan et al. |
| 2019/0266260 A1 | 8/2019 | Grochocki et al. |

OTHER PUBLICATIONS

"Annotating Maps", Retrieved on: Mar. 9, 2016 Available at: https://developer.apple.com/library/ios/documentation/UserExperience/Conceptual/LocationAwarenessPG/AnnotatingMaps/AnnotatingMaps.html.

"Map Note", Published on: May 16, 2013 Available at: https://play.google.com/store/apps/details?id=com.base2apps.mapnotes.

"Map Marker", Published on: Jun. 10, 2015 Available at: https://play.google.com/store/apps/details?id=com.exlyo.mapmarker.

"Unofficial Map for GTA 5", Retrieved on: Mar. 9, 2016 Available at: https://play.google.com/store/apps/details?id=com.tspoon.gta5.gta5map&hl=en.

Zhang, et al., "Annotating and Navigating Tourist Videos", In Proceedings of 18th SIGSPATIAL International Conference on Advances in Geographic Information Systems, Nov. 2, 2010, pp. 260-269.

"Photo Earth: Map & Geotag Pics", Published on: Aug. 29, 2013 Available at: https://play.google.com/store/apps/details?id=com.penguincape.photoearth.

"International Search Report and Written Opinion Issued in PCT Application No. PCT/US19/017738", dated Apr. 3, 2019, 12 Pages.

Wang, et al., "Signaling of Location Metadata in File Formats", In International Organisation for Standardisation Organisation Internationale de Normalisation ISO/IEC JTC1/SC29/WG11 coding of moving pictures and audio-MPEG2003/M10124, Oct. 14, 2003, 2 Pages.

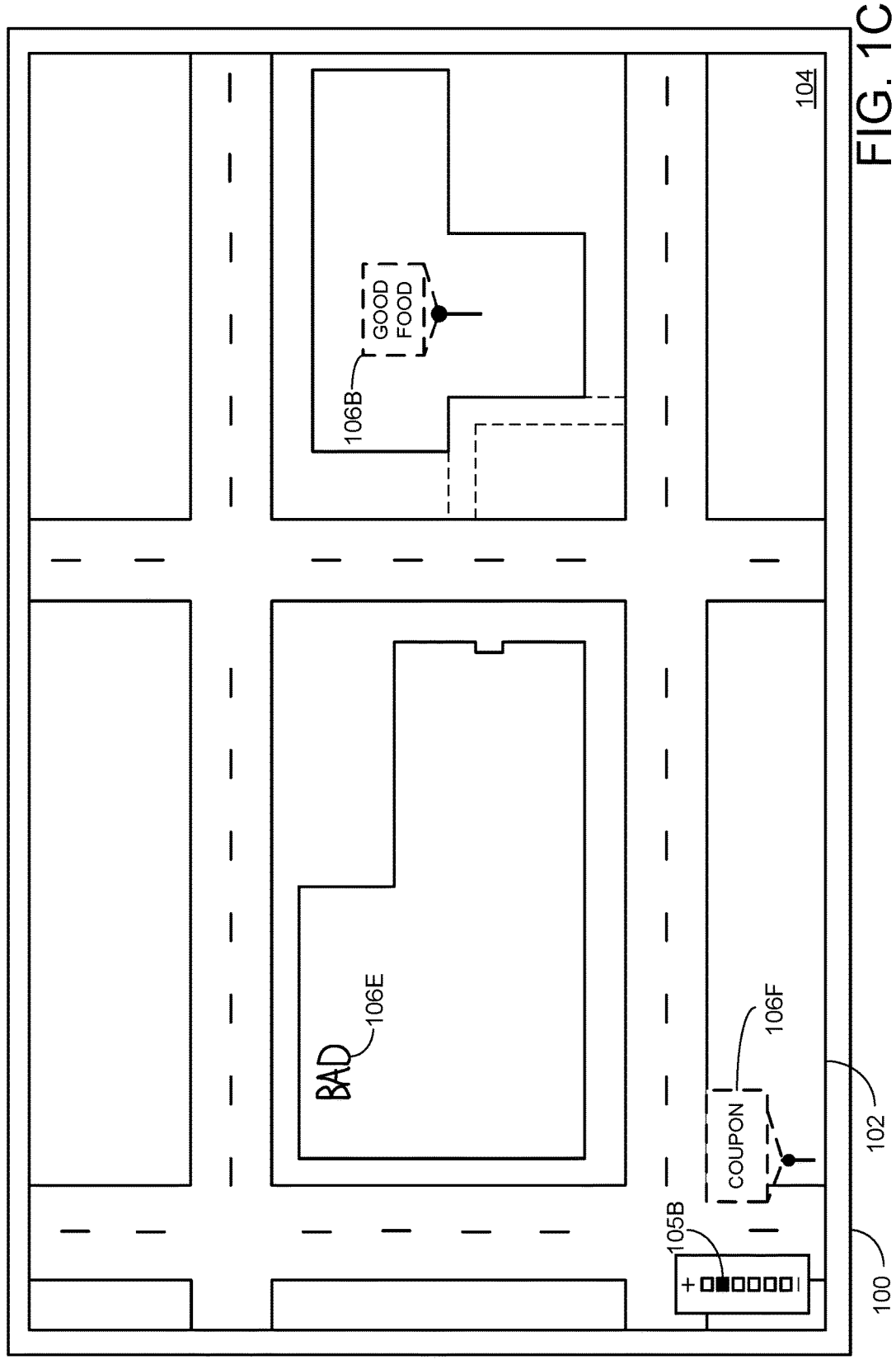

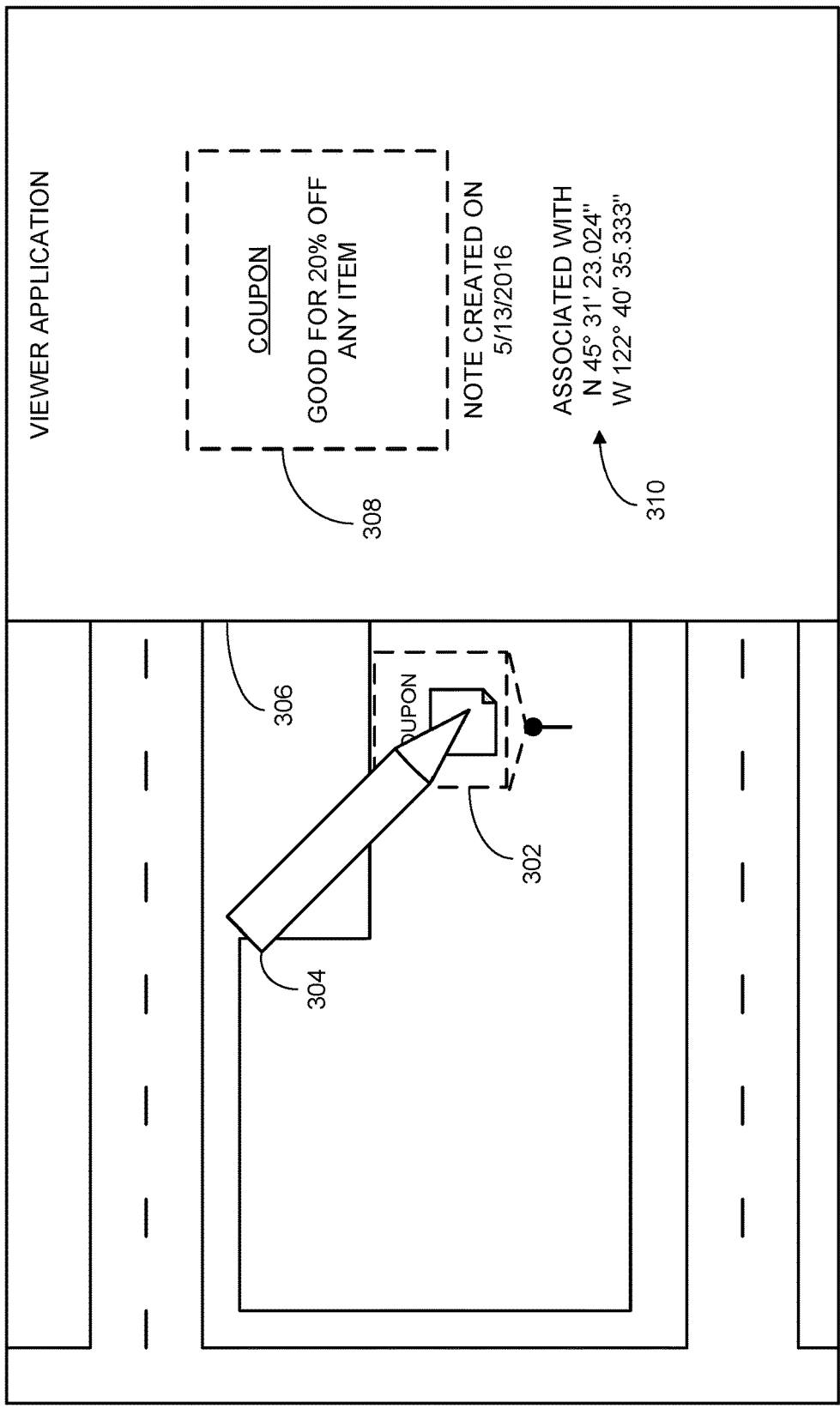

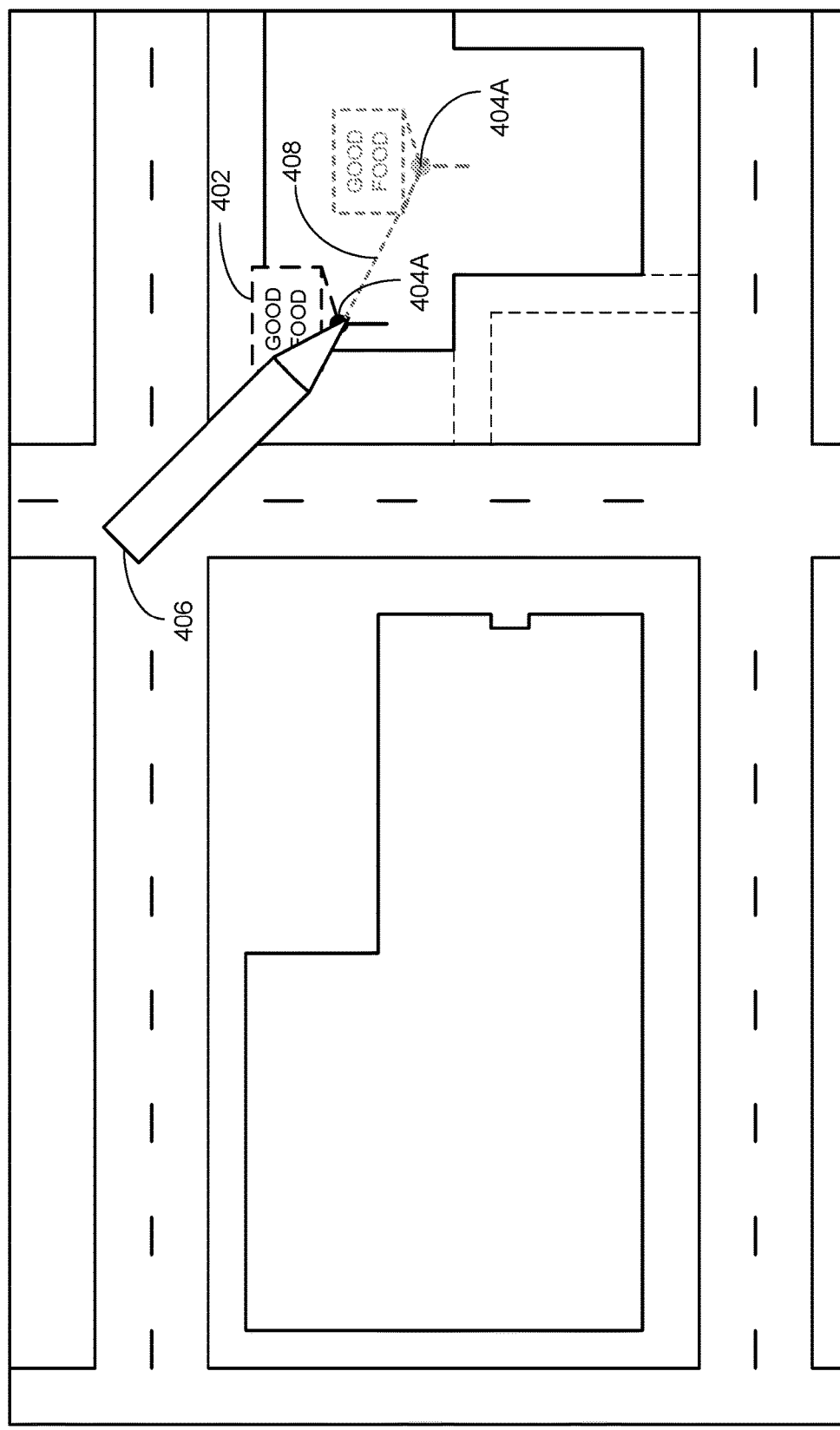

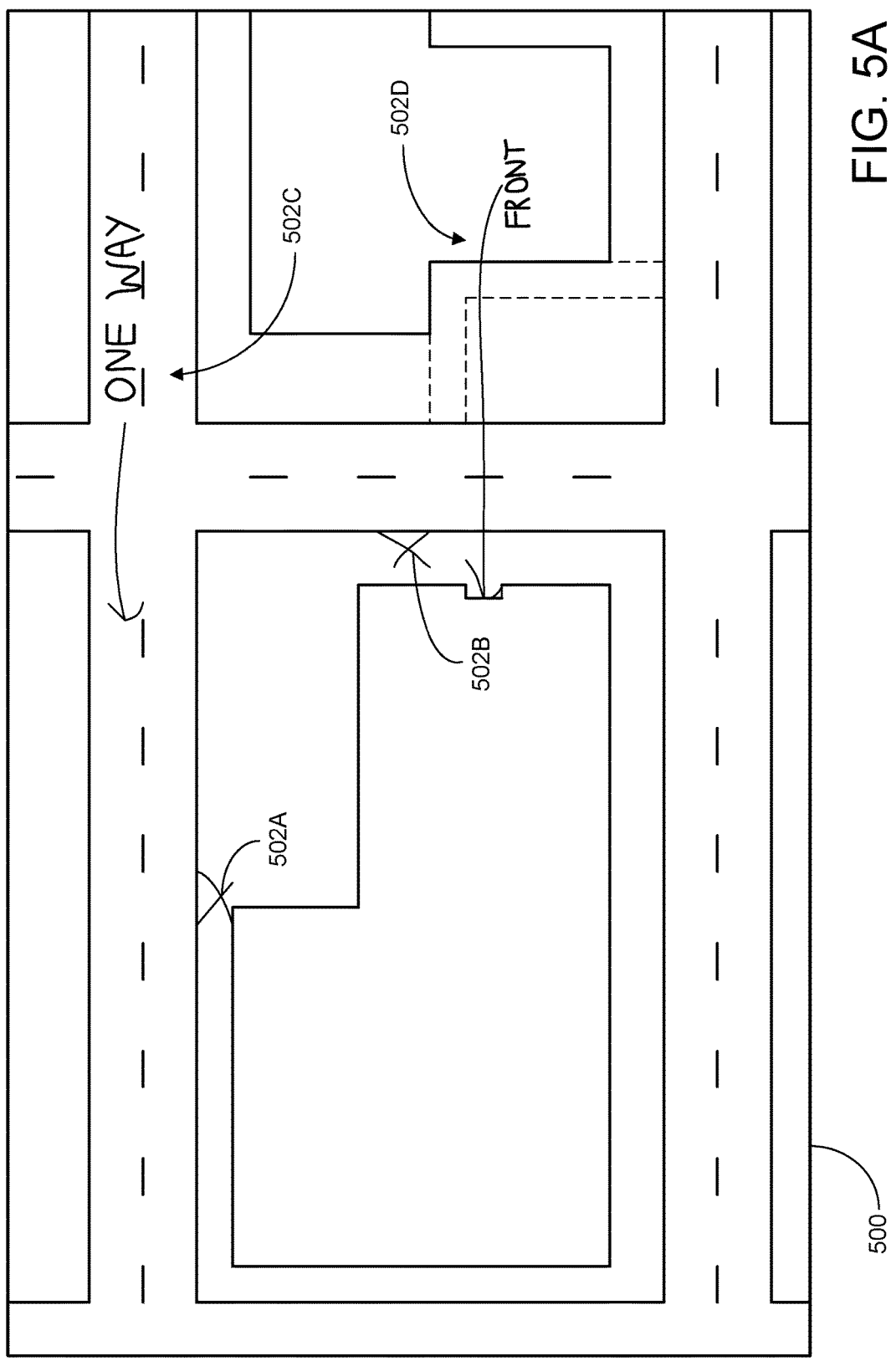

MAP NOTES

CROSS REFERENCE TO RELATED APPLICATIONS

This application claims priority to U.S. Provisional Patent Application No. 62/314,288, filed Mar. 28, 2016, the entirety of which is hereby incorporated herein by reference.

BACKGROUND

Many computing devices can be used to access digital maps, which often provide manipulable representations of real-world environments. Such maps can be used to plan routes, find specific locations, follow step-by-step navigation directions, visualize a current location of a computing device, as well as for other map-related functions. Digital maps may additionally provide information specific to particular locations, buildings, areas, etc., viewable on the map.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore the claimed subject matter is not limited to implementations that solve any or all disadvantages noted in any part of this disclosure.

A computing device includes a display, a logic machine, and a storage machine holding instructions executable to display a map via the display, and associate a note with location data defining a geographic location. The note is associated with an annotation displayable on the map. The annotation is associated with a location parameter defining a map location at which the annotation is displayed on the map corresponding to the geographic location associated with the note. The annotation is associated with a zoom parameter defining one or more reap zoom levels at which the annotation is displayed on the map. The annotation is associated with a context parameter defining one or more computing device contexts with which the annotation is displayed on the map. A notification corresponding to the note is presented based on the computing device being located within a threshold distance of the geographic location.

BRIEF DESCRIPTION OF THE DRAWINGS

FIGS. 1A, 1B, and 1C schematically show an example map for viewing and manipulating map annotations.

FIG. 3 schematically shows user input at an example map causing viewing of a note.

FIG. 4 schematically shows relocation input at a displayed annotation.

FIGS. 5A and 5B schematically show an example map including example map annotations shown individually and grouped as a collection.

DETAILED DESCRIPTION

A user may use a computing device to create and edit computer files, enter text, draw freeform ink lines, and/or otherwise create notes for future review. In some cases, it may be desirable to organize and visualize such notes according to location information associated with the notes. Accordingly, a note taken by a user of a computing device may be associated with a geographic location, and an annotation representing the note may be displayed on a digital map. Organizing location-related notes in this manner may allow users of computing devices to easily and conveniently access location-related information whenever it is desired.

Notes may include any suitable information, and take suitable form. For example, notes may include text, images, audio, video, other computer files, ink data, and/or other suitable forms of information. A note may be manually associated with a location by a user during note creation/editing. Additionally or alternatively, a note may be automatically associated with a geographic location by a computing device upon creation/editing, responsive to evaluating location-related metadata, interpreting note contents, etc. To this effect, a note may be associated with location data, the location data defining the geographic location with which the note is associated.

A note may additionally be associated with an annotation, which may serve as a visible representation of the note on a map. A computing device may include a display, and present a map via a map application. Such a map may include one or more annotations, each annotation representing a note associated with a geographic location. An annotation may be presented at a map location corresponding to the geographic location associated with the note. Accordingly, an annotation may serve as a visual indicator of a note's associated location, as well as shortcut for accessing/viewing the associated note.

Figure 1A:
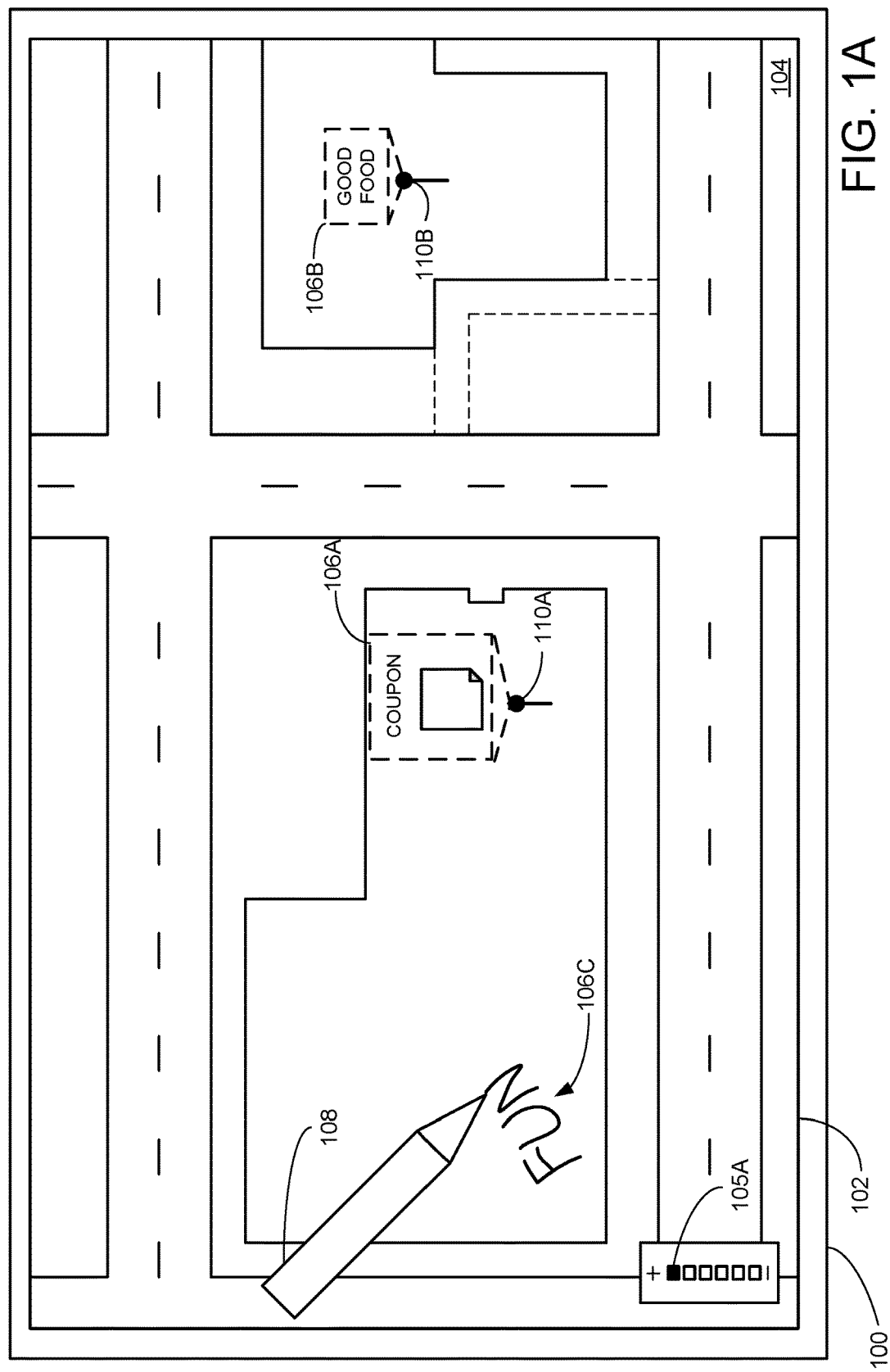
Figure 1B:
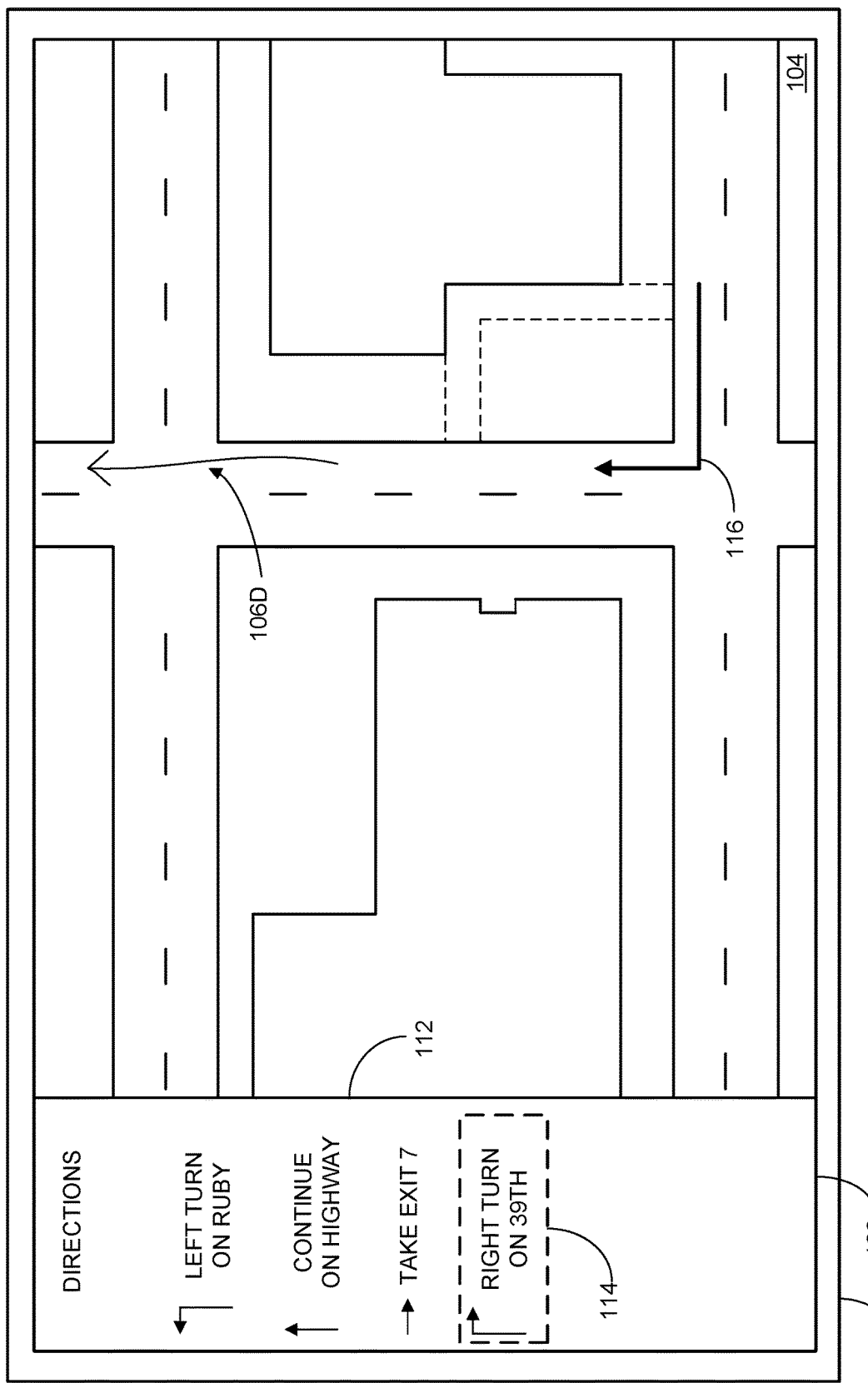

FIGS. 1A, 1B, and 1C show a computing device 100 including a display 102. Via display 102, computing device 100 is displaying a map 104. Computing device 100 maybe virtually any computing device suitable for performing the note creation and annotation display functions described herein. For example, computing device 100 may be a smartphone, tablet, personal digital assistant, netbook, laptop computer, desktop computer, set-top box, head-mounted display device, or virtually any other type of computing device. In some implementations, display 102 may be a touch-sensitive display capable of receiving touch input from a variety of input objects, including passive styluses, active styluses, human fingers, etc. Additionally or alternatively, computing device 100 may accept input from other input sources, including computer mice, keyboards, trackpads, movement-tracking cameras (e.g., detecting finger air writing), etc.

Computing device 100 may be used to create and/or otherwise manage any number of notes, as described herein. A variety of suitable techniques may be used to associate a note with location data, the location data defining a particular geographic location. Such techniques may include manual location association performed by a user, and/or automatic location association performed by computing device 100.

Manual location association may occur at note creation/editing. Alternatively, a user may associate an existing note with a geographic location and/or change the geographic location associated with an existing note. For example, a user may create a note by writing on map 104 to create digital ink data, which may then be saved by the computing device and represented on map 104 by an annotation. Similarly, a user may select a map location on map 104 and be presented with a text-entry box and/or file selection window, allowing the user to create a note including text, computer files, and/or any other suitable information, which may then be represented at the selected location by an annotation. Upon creation of a note in a different interface/application, the user may manually enter location data, thereby associating the created note with a geographic location. Additionally or alternatively, a user may lay existing notes to associate the notes with location data. This may allow the user to associate s with geographic locations not represented by a current map view. Additionally or alternatively, a user may identify a mote shown in a different interface/application, and "drag and drop" the selected note at a location on a map, thereby causing the map to display an annotation representing the dropped note. Similarly, a note already associated with a location may be associated with a different/additional location, manual editing of location data, "dragging and dropping" of an annotation representing the note, etc., as will be described below with respect to FIG. 4.

Notes may be automatically associated with geographic locations under a number of circumstances. For example, upon creation of a new note, a computing device may automatically associate the note with a geographic location. The associated location maybe, for example, the current location of the computing device. For example, if a computing device is used to capture a photograph at a particular geographic location, the photograph may be treated as a note and associated with the geographic location. Additionally, or alternatively, the computing device may evaluate the contents of a created note, and automatically associate it with any referenced geographic locations. For example, a photograph showing a particular landmark may be associated with a geographic location of the pictured landmark. Similarly, if a document references a particular geographic location (e.g., business, street address, landmark, set of coordinates), the document array be associated with the referenced location. Locations may additionally/alternatively be assigned upon editing/accessing/modifying a particular note. For example, if a user edits a document at a geographic location, the entire document and/or the edited portion may be associated with the geographic location. Further, the computing device may scan/otherwise evaluate text notes/computer files/sets of ink data/other suitable information, and automatically assign any notes including location data (e.g., metadata associated with a note) to corresponding geographic locations. Similarly, the computing device may add location data to existing notes based on the note's contents, properties, etc.

As described above, a note may be associated with location data that defines a geographic location. Location data may define a geographic location with any suitable degree of precision. For example, location data may include two-dimensional coordinates for a location associated with a note, expressed as longitude and latitude, for example. As such, the location data may be said to have two degrees-of-freedom (2DOF). Additionally, location data may include a $3^{rd}$ coordinate, expressed as an elevation/altitude of the note, or a zoom level of a map at the time the note was created (e.g., in the case of user-entered text or freeform ink lines).

As such, location data may be described as having three degrees-of-freedom (3 DOF) precision. In some implementations, location data may include an additional three degrees-of-freedom (e.g., pitch, roll, and yaw) for a total of six degrees-of-freedom (6 DOF). For example, a note may take the form of a photograph taken at a particular geographic location. Location data for the note may describe a three-dimensional position at which the note was taken, as well as a point-of-view or "pose" of the camera lens, constituting 6 DOF location data. In the case of ink data, location data may specify a different discrete location for each pixel of the ink data—i.e., the location data may specify a range of locations. Alternatively, a note including ink data may be associated with a single location, and the ink data included in the note may be displayed by a map as an annotation at or near the associated location.

Location data may also/instead include references to names of known locations. For example, a note may be associated with a specific building (e.g., a user's home or workplace), a business, a landmark, a street address, a city/state/region, etc.

Map 104 shows an example map view of a hypothetical geographic location. Map 104 may be manipulable to change the presented map view—to zoom in/out, change the map's orientation, pan to a different geographic location, etc. For example, map 104 is shown at a particular zoom level 105A, though the zoom level of map 104 may be changed in order to zoom in or out. Map 104 also shows multiple example annotations 106. Each annotation 106 may be associated with and/or otherwise represent a note associated with a geographic location, as described above. Specifically, map 104 is displaying annotation 106A, which is associated with a "coupon" computer file, annotation 106B, which represents user-entered text, and annotation 106C, which represents a series of freeform ink lines drawn on map 104.

As shown, map 104 includes annotation 106A, which is a representation of a location-associated note taking the form of a computer file. In the illustrated example, the computer file is a coupon, which may be a written document, picture, email message, etc. However, annotations as described herein may instead be associated with location-associated notes taking the form of any other type of computer file/computer-readable information. For example, the computer file could be a written document, image computer-generated image, photograph, scanned image), audio (e.g., user-recorded audio, downloaded audio, a link to a streaming audio track), digital communication (e.g., email message, text message, instant message), Internet shortcut/link, and/or any other suitable computer files/forms of computer-readable information. In general, a location-associated note including any type of computer information may be created by a user and/or automatically created by the computing system, and an annotation such as annotation 106A may link the information to a specific map location and provide direct access to the information. The specific appearance of annotations 106 shown in FIG. 1A is not intended to limit the present disclosure, and annotations may take any suitable form while still representing location-associated notes.

Annotation 106B is another example of an annotation associated with a note. Annotation 106B is a representation of a note taking the form of user-entered text. Annotation 106B may represent a note created when a user types text directly into a text entry interface of map 104, via an included text editor for example. Alternatively, the note may be created in a different application (e.g., note-taking application, word processing application), and merely represented in map 104 by annotation 106B, as will be described in more detail below. A user may input text via any suitable input system, including a keyboard, voice-to-text module, handwriting recognition software, movement-tracking cameras (e.g., detecting finger air writing), etc.

Annotation 106C is another example of an annotation associated with a note. Specifically, annotation 106C represents a set of freeform ink lines, which may be drawn on map 104 by a user, for example. Freeform ink lines as described herein may represent real-world paths, handwritten letters, drawn shapes, etc.

FIG. 1A shows an input object 108, taking the form of a stylus. In general, any suitable input object may be used for performing freeform inking inputs, allowing for the creation of handwritten notes which may be represented on map 104 by annotations (e.g., passive stylus, active stylus, human finger). Versions of map 104 not presented via touch-sensitive display devices may still accept handwritten notes such as the note represented by annotation 106C. For example, a user may draw freeform ink lines using a mouse or trackpad, utilize a movement-tracking camera that detects finger air writing, and/or write on suitable analog media (e.g., paper) and scan/capture the writing using a digital scanner/camera.

In some implementations, annotations may be shown by the map at the location associated with the represented note—i.e., the location defined by the note's associated location data. However, in some examples the location at which an annotation is displayed on map may differ from the location associated with the note. Accordingly, an annotation may be associated with a location parameter, defining a map location at which the annotation is displayed on the map. For example, a photograph may be associated with location data defining the location at which the photograph was taken, and such a location may be near a famous landmark. The photograph may then be represented on a map by an annotation, which is shown at the location of the landmark, and not the exact location at which the photo was taken. In other words, the photograph may be displayed on the map at a map location defined by a location parameter associated with the annotation, and this map location may correspond to the geographic location associated with the note. Accordingly, each annotation 106 shown in FIG. 1A is present at a different map location of map 104. For example, annotation 106A is shown at map location 110A, while annotation 106B is shown at map location 110B. Each map location 110 may correspond to a geographic location associated with the notes represented by the annotations 106.

As with note-associated location data, a location parameter associated with an annotation may define a map location with any suitable precision. As such, a map location may be defined with 2 DOF (e.g., latitude and longitude), 3 DOF (e.g., latitude, longitude, and elevation), 6 DOF (e.g., 3-dimensional coordinates and pitch, roll, and yaw), etc. Further, annotations may "float" at a particular three-dimensional location, and/or annotations may automatically "snap" to an underlying landscape/building/surface/etc. For example, ink data for a note represented by annotation 106C may specify a three-dimensional location which is above ground level—i.e., the annotation is shown floating above the ground depicted in map 104. The elevation/altitude of the floating ink data may be based on a current zoom level of map 104, for example. Alternatively, upon creation, an ink data note may be associated with locations corresponding to any landscapes/buildings/surfaces which are visible beneath/behind the ink data. As such, annotation 106C may be shown by map 104 as though it were written directly on the ground shown in map 104. In some implementations, whether an annotation is shown as "floating" or "snapped" may be defined by the location parameter.

In some implementations, various interface elements of a map application may be annotated. A location parameter associated with an annotation may, in addition to defining a map location, also define any interface elements with which the annotation is associated. For example, a user may use a map application to view multi-step navigation directions from a starting point to a destination. A user may select and annotate individual steps in a set of directions, as well as annotate map views associated with each step in the set. Such annotations may be associated with location parameters defining the direction steps/map views that the annotations are associated with. In general, a user may edit/annotate any aspect of a map application, and such edits/annotations may be saved as notes, associated with existing notes, and/or otherwise recorded.

FIG. 1B shows computing device 100 presenting map 104, as well as a multi-step set of navigation directions 112. Navigation directions 112 may provide a user of computing device 100 with step-by-step instructions for reaching a destination (e.g., work) from a starting point (e.g., home). As shown, a particular step 114 from the set of navigation directions 112 has been selected, the particular step describing a turn the user is to take at an intersection. Map 104 represents a geographic area at which the turn described by step 114 is to be completed, and illustrates this turn with navigation instruction 116. Map 104 also includes an annotation 106D representing ink data. Annotation 106D may be associated with a location parameter defining the map location at which annotation 106D is shown, and uniquely tying annotation 106D to selected step 114. As such, annotation 106D may be displayed at the defined map location only when step 114 is selected. Selection of other steps from navigation directions 112 may cause map 104 to show the same or different geographic areas, and annotations may be uniquely associated with these other map views, as defined by location parameters associated with each annotation.

In some examples, an annotation may be associated with a zoom parameter, defining one or more map zoom levels at which the annotation is displayed on the map. For example, as described above, map 104 is shown at zoom level 105A in FIG. 1A. However, responsive to a change in zoom level of map 104, different annotations may be shown. This is shown in FIG. 1C, in which map 104 has been zoomed out relative to FIG. 1A to show a larger area. Specifically, map 104 is now shown at zoom level 105B. As shown, zooming out has caused wrap 104 to display a different subset of annotations. Specifically, annotations 106A and 106C are no longer displayed, while annotation 106B has not been affected. Annotations 106A and 106C may be associated with zoom levels other than zoom level 105B, as defined by zoom parameters associated with each annotation, for example, and thus are no longer displayed. Further, map 104 now displays annotations 106E and 106F, which may include zoom parameters defining map zoom level 105B and not 105A, for example.

Computing device 100 may gather/have access to a variety of information pertaining to a current context of the computing device, as well as any users of the computing device. For example, computing device 100 may be configured to determine its own current location, as well as track previous locations and movement patterns. Computing device 100 may additionally have access to a user's notes, computer files, device usage history, communications (e.g., via phone, email, text message), Internet search history, personal preferences, etc.

Computing device 100 may utilize any/all of this collected user context information to selectively display annotations to the user. Each annotation may be associated with a context parameter, defining one or more computing device contexts with which the annotation s displayed on the map. A computing device context may include the computing device's current location, a current time of day, the identity of any users logged into the computing device, the status of any running applications, the state of any data held by the computing device, etc. For example, map 104 may display different subsets of annotations depending on the computing device's current location (e.g., at home, at work, in transit, on vacation). If a user has recently performed an online search for restaurants, map 104 may display annotations representing notes associated with known restaurant locations, and/or annotations corresponding to notes which are tagged/categorized as relating to food, as defined by the context parameter. If a user has an upcoming appointment, map 104 may selectively display annotations related to the appointment—for example, annotations representing notes related to appointment participants, appointment venues, transit routes to/from the appointment, etc.

A context parameter associated with an annotation may additionally include one or more user-defined annotation categories. Accordingly, annotations may be organized and/or selectively displayed based on the annotation categories with which the notes/annotations are associated. User-defined annotation categories may include, for example, notes pertaining to food, types of food, restaurants, notes relating to similar subject matter (places a user wishes to visit, notes including written text), places/areas, routes, notes created while the user was at home/on vacation, notes pertaining to specific people (e.g., friends, family, coworkers) notes received from/shared to other people, notes organized into specific collections, or viewed via different interface tabs, etc. Annotations may be assigned to such user-defined annotation categories by a user upon note creation/editing, and/or automatically by a computing device.

Figure 2:
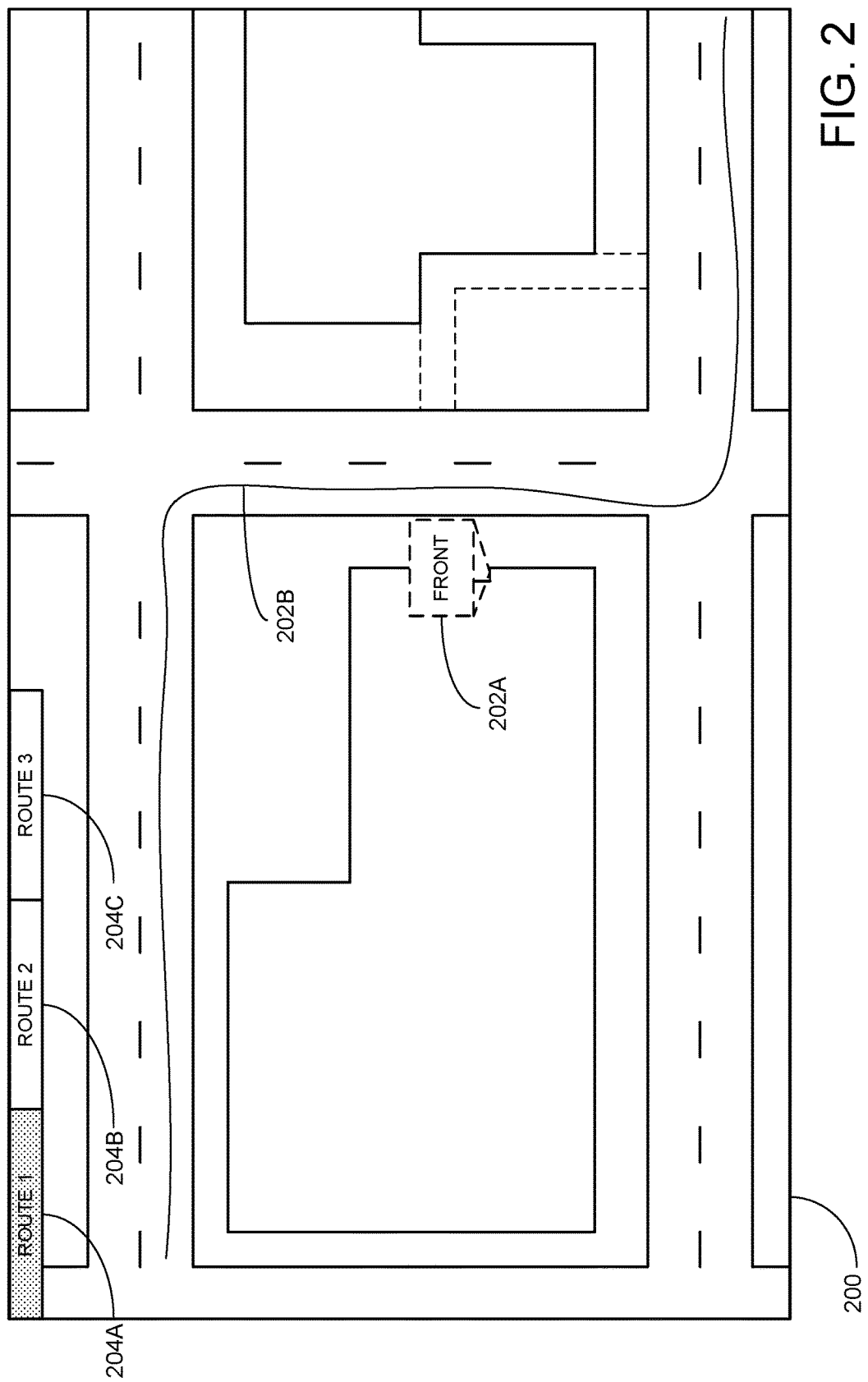
FIG. 2 shows an example map including example map annotations organized by category.

As an example, a map may be organized in such a manner as to allow a user to separate annotations into different groups/categories, which may be independently viewable. For example, a map may utilize a tabbed interface, where each tab represents the same geographic area from the same perspective, though includes different annotations. This may be useful for planning trips, for example, as well as keeping track of notes created at different times, separating notes into different categories, etc. FIG. 2 shows an example map 200 utilizing such a tabbed interface. Map 200 includes a text annotation 202A and a freeform ink line annotation 202B. Map 200 additionally includes a series of tabs 204, each of which may include one or more annotations representing notes associated with geographic locations. As shown in FIG. 2, tab 204A (i.e., "ROUTE 1") is selected. Accordingly, annotations 202A and 202B may be associated with a "ROUTE 1" user-defined annotation category, which may be defined by context parameters associated with the annotations. Accordingly, an annotation associated with a note may he assigned to a particular tab 204, or other user-defined annotation category, and selectively displayed based on which user-defined annotation categories the annotation is associated with, as well as a current context of the computing device. Selection of a different tab of map 200—i.e., "ROUTE 2" or "ROUTE 3"—may cause annotations 202A and 202E to disappear, and cause map 200 to display different annotations associated with the newly selected tab.

The above examples are not intended to be limiting. In general, a computing device may make use of any/all information pertaining to the computing device and/or any users of the computing device when displaying annotations.

In some implementations, annotations may be user-selectable and/or otherwise interactable. For example, selection of a particular annotation representing a computer file may cause a computing device to open the associated computer file. The computer file may be opened as a preview, which may not require the user to open a new application. Alternatively, selection of the annotation may cause the computing device to launch an external application for viewing/editing of the computer file. Similarly, selection of annotations corresponding to user-entered text or freeform ink lines may allow editing of note text or ink data. Further, selection of an annotation may allow the user to associate the represented note with a different location, as will be described more detail below. The map application and cooperating viewing/editing applications may utilize an Application Programming Interface (API) for passing data between the map application and cooperating viewing/editing applications.

Selection of a displayed annotation is illustrated in FIG. 3. Specifically, FIG. 3 shows a map 300 displaying an annotation 302. Annotation 302 has been selected via an annotation selection input performed by input object 304. Input object 304 is presented as an example, and other suitable touch-related and not touch-related input modalities may be used to select annotations as described herein.

Based on selection of annotation 302, the computing device presenting map 300 has opened a viewer application 306, which is presenting note 308 associated with annotation 302. In some implementations, viewer application 306 may be a component of an application rendering map 300. Alternatively, responsive to selection of an annotation, an associated note may he opened in an application external to the map. Application 306 additionally includes additional information about note 308, including an indication of the geographic location 310 with which the note is associated.

After selection of an annotation, an associated note may be opened/viewed in any suitable manner, via any suitable application. Further, an opened note may be viewed, and/or properties/contents of the note may be edited. Though note 308 is a computer file, annotations associated with user-entered text or ink lines may similarly be selected and opened for viewing/editing.

In some implementations, the geographic location with which a note is associated, and/or the map location with which an annotation is associated, may be changed based on receiving a relocation input. This is illustrated in FIG. 4, which shows an example map 400. Map 400 is presenting an annotation 402, which is in the process of being relocated from original map location 404A to new map location 404B. Relocation is being performed based on input object 406, which is performing a relocation input 408 at map 404. As with annotation selection shown in FIG. 3, annotation relocation may be performed with any suitable input object, and/or via any suitable input modality. Relocation input 408 may be done in a variety of suitable ways. For example, relocation input may be performed by "dragging and dropping" an annotation displayed on map 400.

In some implementations, annotations displayed by a map may be grouped into collections. Collections may allow a user to edit/share/manipulate notes as a group, rather than as individual notes. Annotations may be grouped into collections automatically by a map annotation interface, and/or manually by a user. For example, collections may be automatically generated based on a proximity of assigned note locations—i.e., annotations corresponding to all notes assigned to locations within a threshold distance of each other are grouped into a collection. Additionally or alternatively, annotations may be grouped into collections based on context parameters associated with annotations (e.g., annotations associated with the same user-defined annotation categories may be automatically grouped into a collection). In some implementations, annotations may be manually grouped into collections by a user. For example, the user may group a set of annotations into a collection by selecting all annotations, and performing some function to group them. For example, a user may circle a set of annotations to group them into a collection.

Figure 5B:
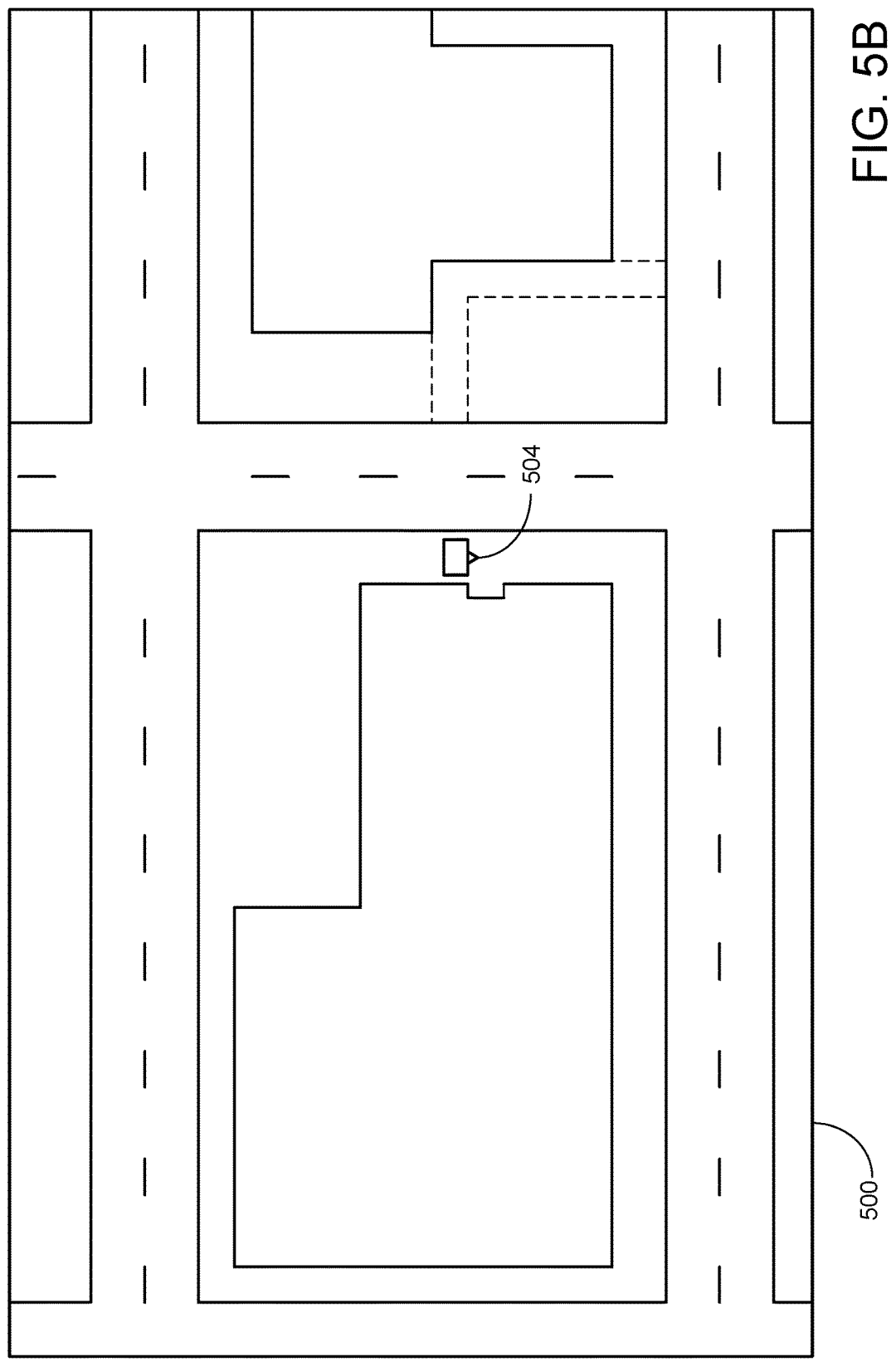

Grouping of annotations into collections is shown in FIGS. 5A and 5B. FIG. 5A shows an example map 500, including several annotations 502. Map 500 may be presented by a computing device similar to computing device 100 described above. As shown, annotations 502 are representing notes taking; the form of ink data. The annotations shown in FIGS. 5A and 5B are labeled as representing four separate notes. For example, each discrete ink line/marking shown in FIG. 5A may be a separate annotation, representing a different distinct note. For the purpose of describing annotation collections it will be assumed that the annotations shown FIG. 5A represent at least two different notes.

FIG. 5B shows map 500 after the annotations 502 have been grouped into a collection 504. Collection 504 is represented at a particular location with respect to map 500, however, an annotation collection may be displayed at any suitable map location. In some implementations, a user may be able to select/interact with collection 504 in order to change the location at which it is represented, and this may or may not affect location data for notes represented by annotations included in the collection, and location parameters associated with the annotations. Further, selection of/interaction with collection 504 may cause annotations 502 to be displayed/hidden. The specific appearance of collection 504 in FIG. 5B is not intended to limit the present disclosure. In general, a map 500 may indicate the presence of an annotation collection in any suitable fashion.

Maps such as those described herein may be manipulable to change a viewing angle/perspective of the map. For example, a user may manipulate a map in order to view different locations, zoom in/out, rotate the map, view the map in a "street view" mode, etc. Responsive to changes in map perspective/orientation, annotations shown on the map may be differently displayed. For example, rotation of a map may cause corresponding rotation of displayed annotations.

Figure 6A:
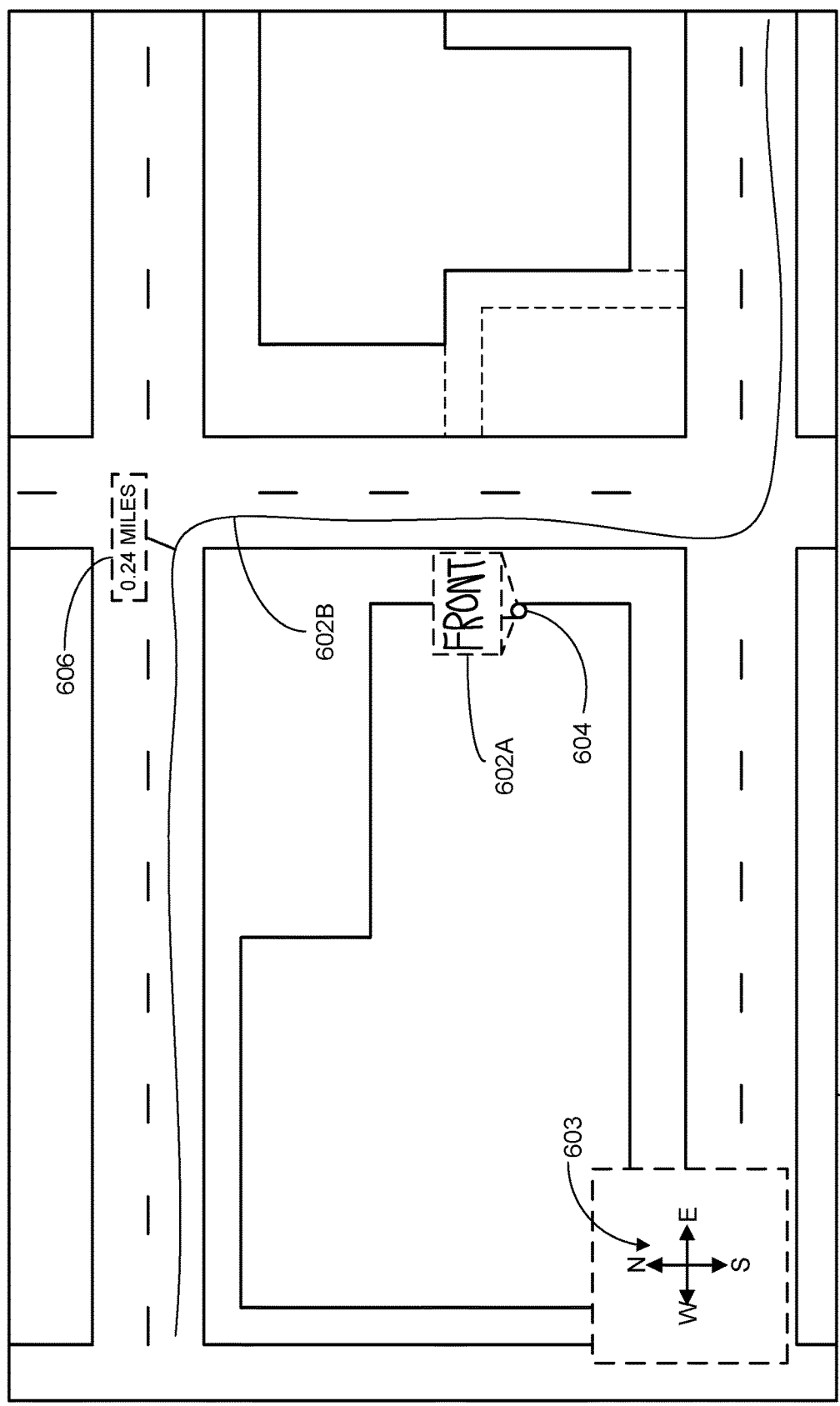
FIGS. 6A and 6B schematically show two orientations of an example map displaying annotations.

However, there are some circumstances in which annotation rotation may not be desirable, or some annotations would be better suited to certain types of reorientation than others. For example, FIG. 6A shows an example map 600 that may be displayed by a computing device via a display. Map 600 includes annotations 602 representing freeform ink notes associated with various geographic locations. Annotations 602 may represent freeform ink notes created responsive to a computing device presenting map 600 receiving freeform inking inputs directed at map 600. Specifically, map 600 includes annotation 602A representing handwritten letters, and annotation 602B representing a real-world path. For the purpose of describing annotation rotation, the orientations of annotations 602 shown in FIG. 6A will be referred to as "first" orientations, and the orientation of map 600 will he referred to as a first map orientation—i.e., a vertical axis of map 600 is aligned North/South, as shown by compass rose 603.

Responsive to a change in orientation of map 600, annotations 602 may exhibit a variety of annotation rotation behaviors, including an orientation-agnostic behavior and an orientation-dependent behavior. For example, as the orientation of map 600 changes, the orientation of each annotation 602 may change such that the relationship between each annotation and nearby map features is preserved. During such rotation, the position of annotation 602B with respect to the road it is drawn on may not change even as the orientation of the map changes. As such, annotations that rotate in this manner may be described as orientation-agnostic. This may allow a user to easily interpret the route represented by annotation 602B regardless of the orientation of map 600. However, this may also cause handwritten letters shown as part of annotation. 602A to be presented with an orientation that makes the writing difficult to read. Alternatively, annotations 602 may exhibit an orientation-dependent behavior relative to the map. In other words, as the orientation of the map changes, the relationship between the annotations and underlying map features may change in a manner consistent with the map's change in orientation. This may ensure that handwritten letters shown as part of annotation 602A always have a readable (e.g., right side up) orientation though also may remove the association between annotation 602B and the map features it was drawn over.

Accordingly, an annotation as described herein may be associated with an orientation parameter defining one of a plurality of annotation rotation behaviors, including an orientation-dependent behavior and orientation-agnostic behavior. As a result, the rotation behavior of each particular annotation may be specified separately, such that responsive to a change in map orientation, each annotation adopts a suitable orientation.

An annotation's rotation behavior may be manually defined by a user, and/or automatically defined by a computing device. For example, a map annotation interface may be configured to evaluate notes in order to distinguish handwritten letters/symbols, text, and/or images (e.g., annotation 602A), from routes/arrows/real-world paths (e.g., annotation 602B). Annotations may then be automatically associated with suitable orientation parameters—for example, an orientation parameter associated with annotation 602A nay specify an orientation-dependent behavior, while an orientation parameter associated with annotation 602B may specify an orientation-agnostic behavior. Further, a user may specify during note creation how a note's annotation should behave in response to a change map orientation. For example, a user may prescript and/or postscript note creation by drawing dot/symbol and/or performing one or more gestures in order to specify an orientation behavior for an annotation associated with the created note.

Further, an orientation parameter defining an orientation-dependent behavior may associate the orientation-dependent behavior with an annotation pivot point around which an annotation rotates as an orientation of the map changes. For example, FIG. 6 shows a pivot point 604 associated with annotation 602A. In some implementations, a user may specify the pivot point about which the annotation should rotate as the map rotates, and this pivot point may differ from the geographic location with which the represented note is associated.

Figure 6B:
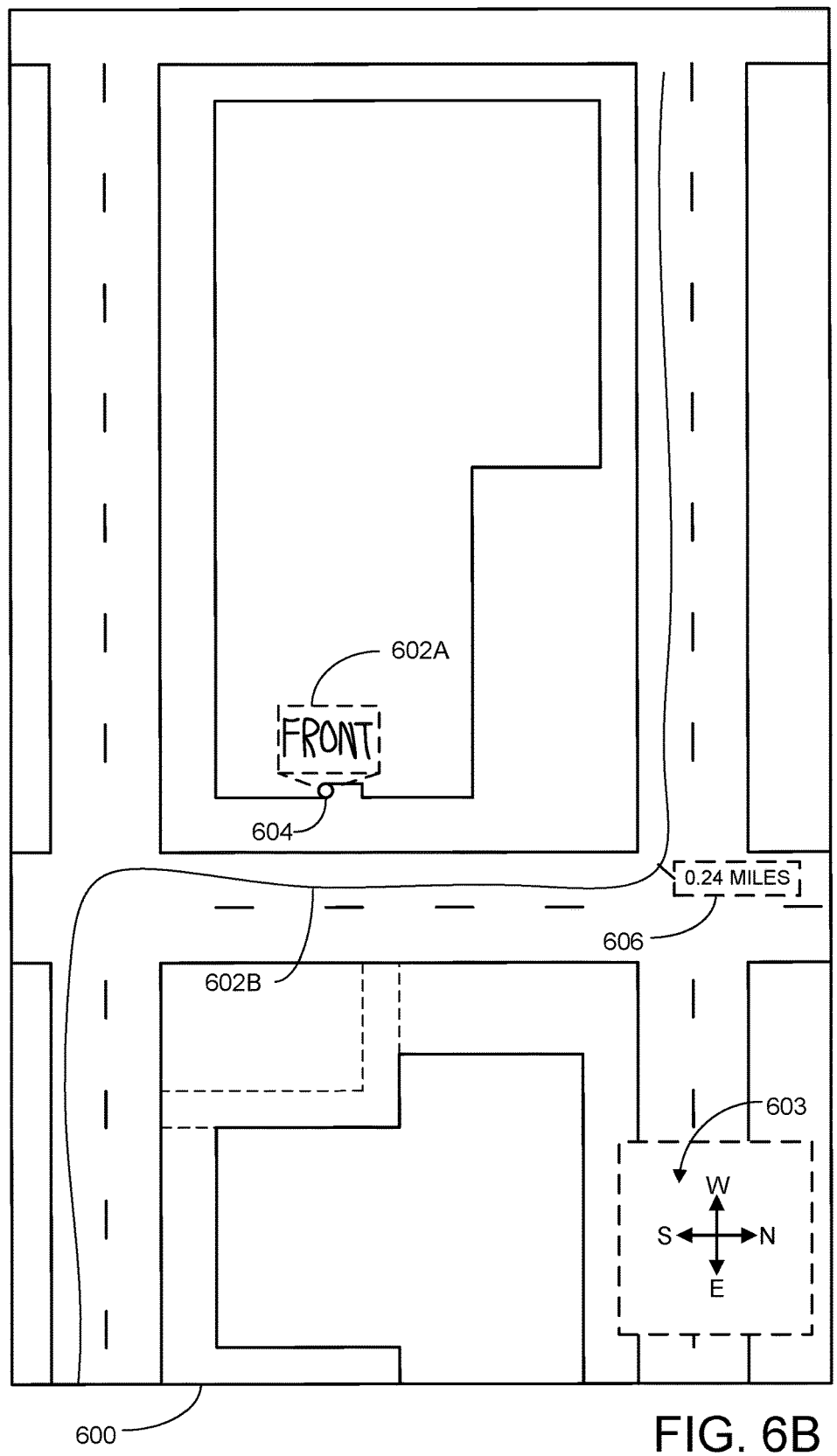

Selective reorientation of annotations responsive to changing map orientation is illustrated in FIG. 6B. FIG. 6B shows map 600 changed from the first map orientation to a second map orientation (a vertical axis of map 600 is now aligned East/West, as shown by compass rose 603). In FIG. 6B, annotation 602A has rotated from its first orientation to a second orientation about pivot point 604 in an orientation-dependent manner. Specifically, the relationship between the annotation and the underlying map features has changed, and handwritten letters included in annotation 602A remain easily legible. In contrast, annotation 602B has maintained its first orientation relative to the underlying map features, thereby exhibiting orientation-agnostic behavior.

Though the above description of selective annotation reorientation focused on annotations representing freeform ink notes, other types of annotations may also be selectively reoriented as a map changes orientation. For example, annotations representing computer files, image thumbnails, user-entered text, etc., may selectively reorient so as to ensure that annotation contents are still easily discernable by a user regardless of map orientation.

In some implementations, an annotation such as those described herein may be displayed on a map along with supplementary information. For example, ink data may be used to illustrate a route of a user, as with the note represented by annotation 602B. The computing device may analyze the ink data in order to estimate a length of a real-world path represented by the freeform ink line. This is shown in FIGS. 6A and 6B, in which annotation 602B is displayed along with supplementary information 606. Supplementary information 606 indicates that the real-world path represented by annotation 602B covers approximately 0.24 miles. Additionally or alternatively, displayed supplementary information may take other forms. For example, a user may associate a note with a location, and designate that note as representing an important landmark. Accordingly, the computing device may persistently display supplementary information on the map indicating the relative location of the important landmark, regardless of the current map view. For example, a user may associate a note with the location of a fire hydrant, and the map annotation interface may provide the user with information indicating the user's distance from the fire hydrant, along with an arrow pointing toward the fire hydrant.

As described herein, a note associated with a geographic location may additionally be associated with a notification to be presented under specific circumstances. The notification a in turn be associated with a notification parameter, defining one or more computing device contexts with which the notification is presented. For example, a notification may be presented based on the computing device being located within a threshold distance of the geographic location associated with the note to which the notification corresponds. Additionally, or alternatively, the computing device may evaluate a number of context factors when determining when to present a notification, including time-of-day, recent communications, user preferences, Internet search history, etc.

Presenting a notification may include presenting a user with the note corresponding to the notification, and/or presenting the user with an annotation representing the note. Upon creating a note, the user may manually request that the note be presented to the user under certain circumstances. Additionally or alternatively, the map annotation interface may automatically determine when/if a particular note should be presented to a user.

For example, a photo may be associated with a particular geographic location. When a user reaches the geographic location, or comes within a threshold distance of the geographic location, a computing device may automatically present the photo to the user. As another example, a computing device may determine that a particular file is a boarding pass for a user's upcoming flight, and associate the file with the location of a local airport. Accordingly, the computing device may automatically present the boarding pass to the user a certain amount of time before the flight departs, and/or when the user reaches the airport or comes within a threshold distance of the airport. Similarly, a computing device may determine that a user frequently opens and edits a document upon reaching a local coffee shop. As such, the map annotation interface may associate the document with the coffee shop, and automatically present the document to the user when the user reaches the coffee shop.

Figure 7:
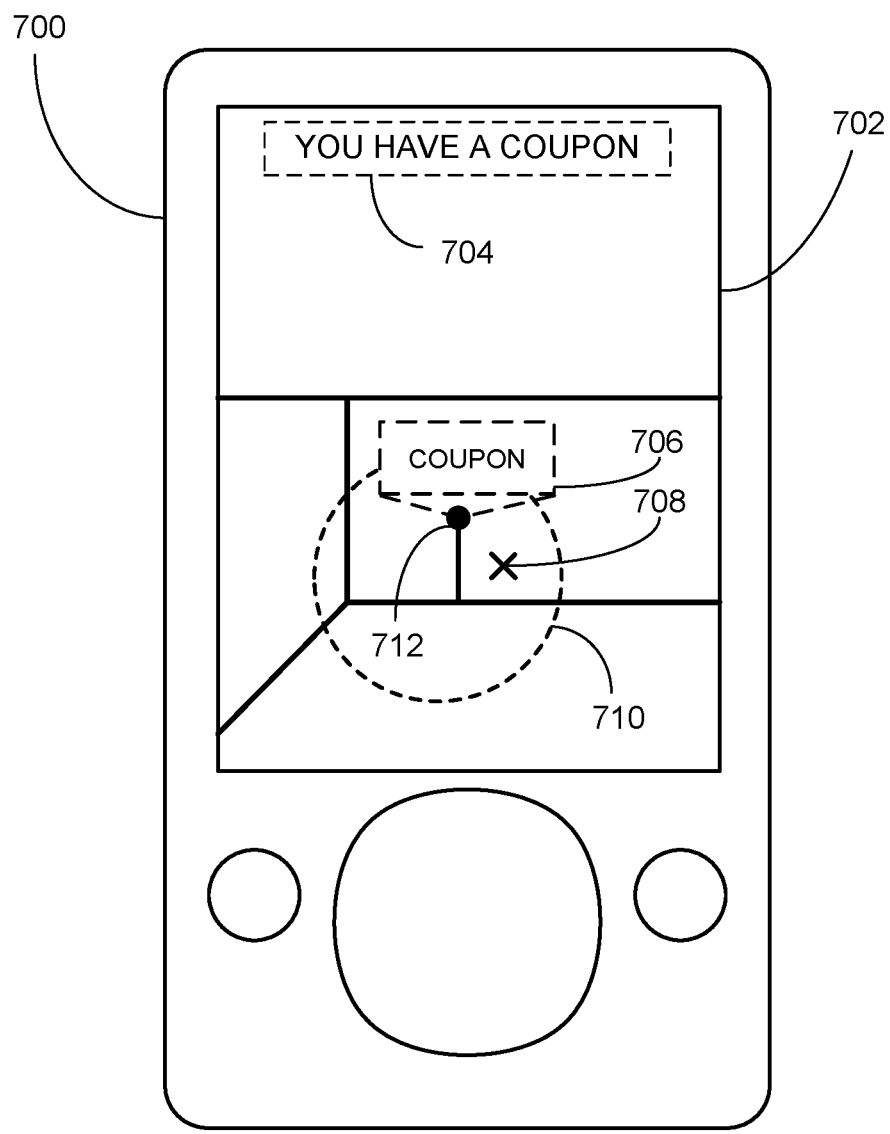
FIG. 7 schematically shows an example computing device presenting an example notification.

Automatic presentation of a note associated with a location is illustrated in FIG. 7. FIG. 7 schematically shows an example computing device 700, taking the form of a mobile device. Computing device 700 may be usable to render and display a map, as well as other visual content, via a display 702. As shown in FIG. 7, computing device 700 is presenting a notification 704, the notification corresponding to a computer file represented as annotation 706. Computing device 700 may present notification 704 based on determining that a current location 708 of the computing device is within a threshold distance 710 of the geographic location associated with the computer file. Additionally, or alternatively, notification 704 may be presented based on determining that the computing device is within a threshold distance of the map location 712 of annotation 706, in the event that the map location differs from the geographic location. For example, the computer file may be a coupon usable at a local business, and the computing device may present notification 704 once the computing device is within a threshold distance of the business. Presentation of notifications in this manner may allow a user to easily access computer files and/or other information associated with geographic locations without requiring the user to manually retrieve such information.

Location-associated notes created by a user may additionally; be selectively shared with one or more other users, allowing users to view and/or interact with notes created by their friends, family, peers, community members, etc.

At note creation, a user may specify to what extent and under what circumstances a note may be shared. For example, a created note may be kept private—only viewable on the device from which it was created. Additionally or alternatively, a note may be synchronized to multiple devices each owned by the same user. Such synchronization may occur over wired/wireless communication between devices. Additionally, or alternatively, a created note may be uploaded to a user's profile/account in a map data service, then downloaded by other devices belonging to the user automatically and/or upon user request.

Upon uploading notes to a map data service, the notes may be viewed/downloaded by devices belonging to other users. An uploaded note may be published to a user's social network profile, and/or added to a public note service, making an annotation representing the note viewable to any other users of a map application. For example, a user may create a note including text, computer files, ink data, etc., describing a recent trip taken by the user, and share this note with the general public via a social network. As another example, a user may create a note indicating bad traffic on a local highway, and upload the note to a map data service, where it may be viewable as an annotation by others in the area.

A user may additionally specify which users/groups of users may see a particular annotation. For example, a user may choose to share a note with a second user. Such sharing may occur via wired/wireless communication between devices belonging to the first and second users. Additionally or alternatively, the shared note may be uploaded to a map data service, and downloaded by the second user. For example, the first user may send a link to the second user allowing the second user to download the shared note, and/or a device belonging to the second user may automatically download the shared note without prompting the second user. Upon receiving the shared note, a device belonging to the second user may selectively display the shared note in a map application as an annotation, as with notes described above. In some implementations, the first user may choose to share one or more notes with groups of other users. For example, a user may share notes with his friends, family, other users within a threshold distance, business partners, custom user-defined groups, etc. Notes may be shared either individually and/or as groups/collections.

Figure 8:
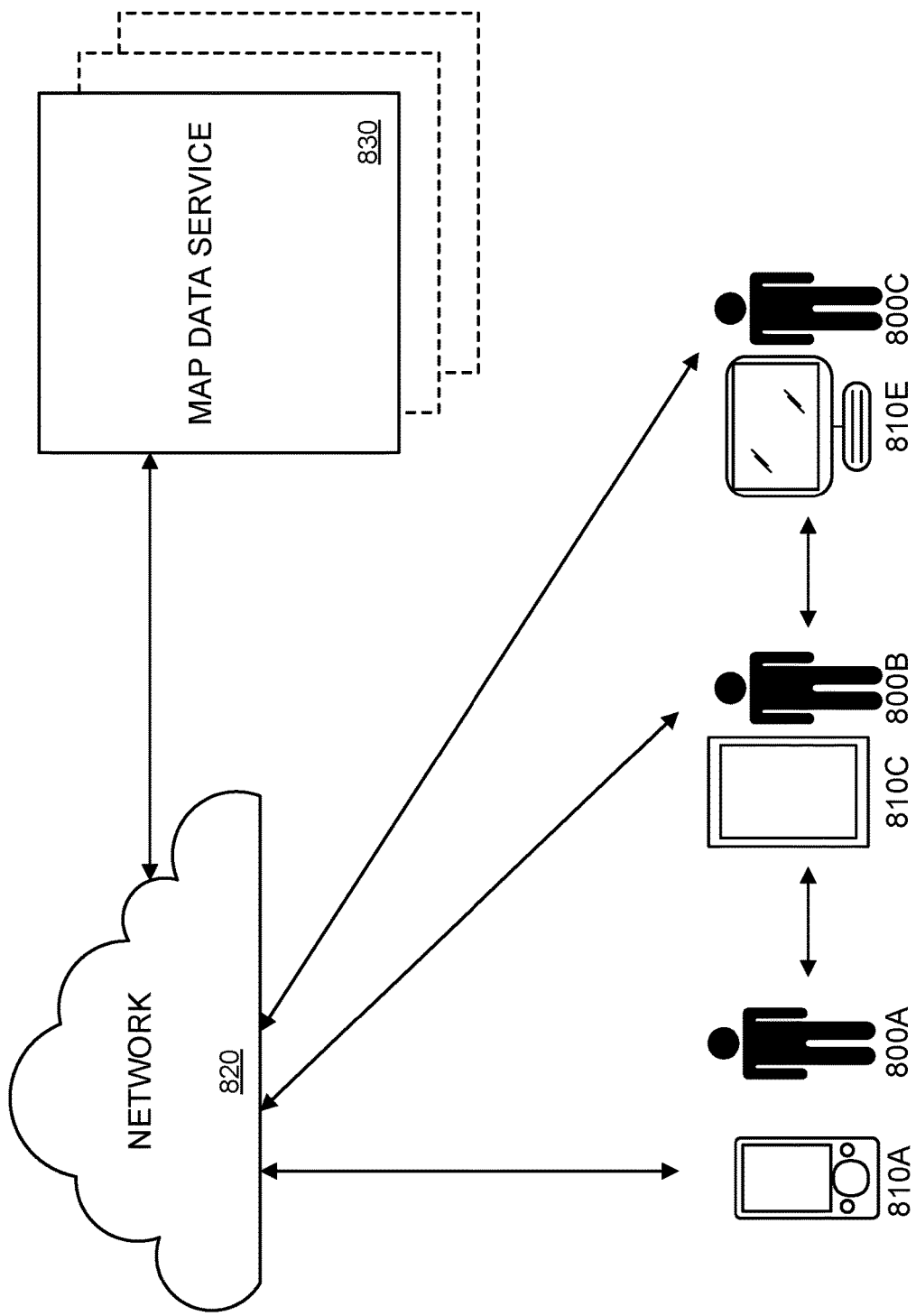
FIG. 8 schematically depicts sharing of map data and notes between computing devices.

FIG. 8 schematically illustrates note sharing between users of a map data service. Specifically, FIG. 8 shows users 800, each of which is the owner of a different computing device 810. Each device 810 may be used to present a map annotation interface, as described above. Each user 800 may use his/her device 810 to create location-associated notes and selectively view such notes as annotations on a map. Further, created notes may be shared between devices 810. Such note sharing may occur via direct communication between devices 810, via wired/wireless linkage, for example. Additionally or alternatively, shared notes may be uploaded to a computer network 820 which may be any suitable computer network such as, for example, the Internet. From network 820, shared notes may be received and stored by one or more map data services 830. From map data service 830, other users 800 may access shared notes by way of network 820, as described above.

In some implementations, the methods and processes described herein may be tied to a computing system of one or more computing devices. In particular, such methods and processes may be implemented as a computer-application program or service, an application-programming interface (API), a library, and/or other computer-program product.

Figure 9:
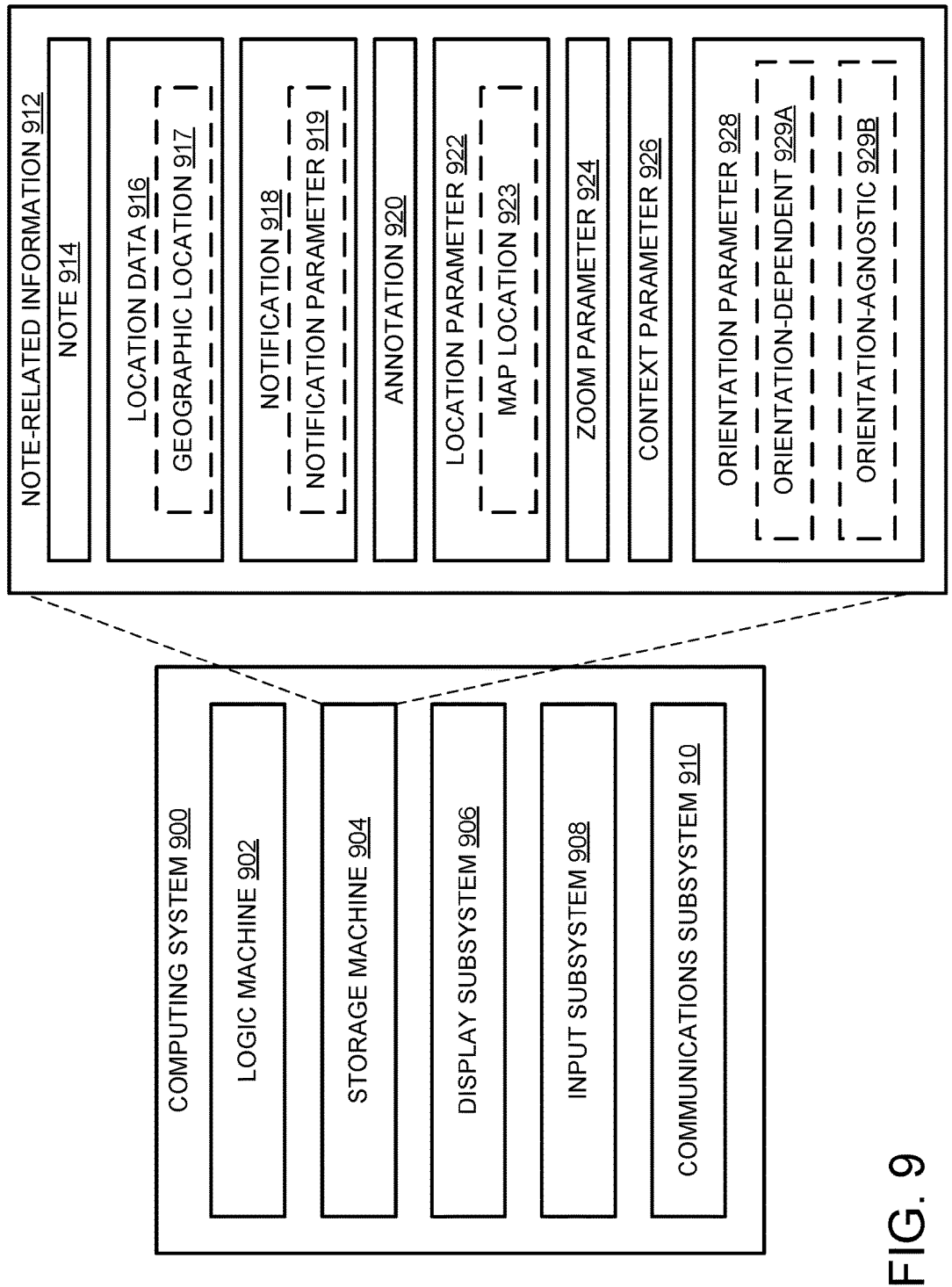
FIG. 9 schematically shows an example computing system.

FIG. 9 schematically shows a non-limiting implementation of a computing system 900 that can enact one or more of the methods and processes described above. Computing system 900 is shown in simplified form. Computing system 900 may take the form of one or more personal computers, server computers, tablet computers, home-entertainment computers, network computing devices, devices, mobile computing devices, mobile communication devices (e.g., smart phone), and/or other computing devices. In particular, computing system 900 may be used to present a map, associate notes with geographic locations, and associate the notes with annotations displayed on the map.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 1004 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or tent-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Storage machine 904 may hold note-related information 912, which may include any/all information used by computing system 900 when displaying a map. Specifically, note-related information 912 includes a note 914, which may take the form of a computer file, text entered by a user of computing system 900, a freeform ink line drawn on a map, etc. Note 914 may be associated with location data 916, which may define a geographic location 917 with any suitable precision, as described above.

Note 914 may be associated with a notification 918, which may in turn be associated with a notification parameter 919, defining one or more computing device contexts with which notification 918 is presented. For example, notification 918 may be presented based on determining that computing system 900 is within a threshold distance of geographic location 917.

Note 914 may be associated with an annotation 920, which may be a visual representation of the note displayed by computing system 900 on a digital map.

Annotation 920 may be associated with a location parameter 922 defining a map location 923 at which the annotation is displayed on the map, the map location corresponding to geographic location 917 associated with note 914. Location parameter 922 may further define any interface elements with which the annotation is associated, as well as whether the annotation should be displayed as "snapped" or "floating."

Annotation 920 may be associated with a zoom parameter 924 defining one or more map zoom levels at which the annotation is displayed on the map.

Annotation 920 may be associated with a context parameter 926 defining one or more computing device contexts with which the annotation is displayed on the map.

Annotation 920 may be associated with an orientation parameter 928 defining one of a plurality of annotation rotation behaviors 929, the plurality including an orientation-dependent behavior 929A and an orientation-agnostic behavior 929B. In some cases, orientation parameter 928 may define only one of the annotation rotation behaviors 929, and the ed behavior may determine how annotation 920 is rotated responsive to a change in orientation of a map on which the annotation is displayed.

In some implementations, note-related information 912 may take the form of a data file/object, and/or other discrete collection of computer-readable information. In other implementations, components of note-related information 912 (e.g., note 914, location data 916, notification 918, annotation 920, parameters 922, 924, 926, and 928) may be stored in one or more locations and/or stored in one or more separate databases/archives. For example, location data 916, notification 918, annotation 920, and any parameters associated with annotation 920 may be stored in a separate archive/directory from note 914, though still associated with note 914 by reference. Alternatively, each of note 914, location data 916, notification 918, annotation 920, and parameters 922, 924, 926, and 928 may be stored as separate data files/objects, and associated with each other through a note association database/directory maintained by computing system 900. In general, note-related information 912 may be held by storage machine 904 in any suitable manner. Further, note-related information 912 may correspond to a single note, and storage machine 904 may hold multiple sets of note-related information 912, one for each created note. Alternatively, note-related information 912 may take the form of a database, including a different entries/sets of information for each note.

As described above, a note such as note 914 may take the form of user-entered text, a computer file, a freeform ink line, and/or any other suitable set of computer-readable information. Note 914 may be created by a user of computing system 900, automatically created by computing system 900, received by computing system 900 from a $3^{rd}$ party (e.g., shared by a user of a different computing system), etc. Note 914 may be associated with one or more locations, and represented on a map by one or more annotations.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, script, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 1006 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 900 to send and/or receive messages to and/or from other devices via a network such as the Internet.

In an example, a computing device comprises: a display; a logic machine; and a storage machine holding instructions executable by the logic machine to: display a map via the display; associate a note with location data defining a geographic location; associate the note with an annotation displayable on the map; where the annotation is associated with a location parameter defining a map location at which the annotation is displayed on the map, the map location corresponding to the geographic location associated with the note; where the annotation is associated with a zoom parameter defining one or more map zoom levels at which the annotation is displayed on the map; where the annotation is associated with a context parameter defining one or more computing device contexts with which the annotation is displayed on the map; and present a notification corresponding to the note based on the computing device being located within a threshold distance of the geographic location. In this example or any other example, the note is a computer file. In this example or any other example, the note is opened based on receiving user input at the annotation displayed on the map. In this example or any other example, the note is opened in an application external to the map. In this example or any other example, the note is text entered by a user of the computing device. In this example or any other example, the note is a freeform ink line drawn on the map. In this example or any other example, the annotation associated with the note is displayed on the map along with supplementary information, the supplementary information indicating a length of a real-world path represented by the freeform ink line In this example or any other example, the annotation is associated with an orientation parameter defining one of a plurality of annotation rotation behaviors, the plurality including an orientation-dependent behavior and an orientation-agnostic behavior. In this example or any other example, the orientation parameter associates the orientation-dependent behavior with an annotation pivot point around which the annotation rotates as an orientation of the map changes relative to the display. In this example or any other example, the context parameter eludes one or more user-specified annotation categories. In this example or any other example, the location parameter further defines a particular step in a multi-step set of navigation directions, and the annotation is displayed on the map when the particular step is selected. In this example or any other example, multiple annotations are collectively represented as an annotation collection. In this example or any other example, the annotation is associated with a different map location based on receiving a relocation input at the annotation displayed on the map. In this example or any other example, a notification parameter associated with the note defines one or more computing device contexts with which the notification is presented.

In an example, a computing device comprises: a display; a logic machine; and a storage machine holding instructions executable by the logic machine to: display a map via the display; associate a first note with location data defining a first geographic location; associate the first note with a first annotation displayable on the map, where the first annotation is associated with a first orientation parameter defining an orientation-dependent behavior; associate a second note with location data defining a second geographic location; associate the second note with a second annotation displayable on the map, where the second annotation is associated with a second orientation parameter defining an orientation-agnostic behavior; while the map is displayed with a first orientation relative to the display, display the first annotation representing the first note and the second annotation representing the second note with a first annotation orientation; and while the map is displayed with a second orientation relative to the display, the second orientation different from the first orientation, display the first annotation with a second annotation orientation, different than the first annotation orientation, and display the second annotation with the first annotation orientation. In this example or any other example, the first annotation and the second annotation are associated with zoom parameters defining one or more map zoom levels at which the annotations are displayed on the map. In this example or any other example, the first annotation and the second annotation are associated with context parameters defining one or more computing device contexts with which the annotations are displayed on the map. In this example or any other example, the first orientation parameter associates the orientation-dependent behavior with an annotation pivot point around which the first annotation rotates as an orientation of the map changes relative to the display. In this example or any other example, the first note and the second note are freeform ink lines drawn on the map.

In an example, a computing device comprises: a display; a logic machine; and a storage machine holding instructions executable by the logic machine to: display a map via the display; receive a first freeform inking input directed to the map; based on the first freeform inking input, create a first freeform ink note; evaluate the first freeform ink note to identify the first freeform ink note as representing handwritten letters; associate the first freeform ink note with first location data defining a geographic location; associate the first freeform ink note with a first annotation displayable on the map; where the first annotation is associated with a first location parameter defining a first map location at which the first annotation is displayed on the map, the first map location corresponding to the geographic location associated with the first freeform ink note; where the first annotation is associated with a first orientation parameter defining an orientation-dependent behavior based on the first freeform ink note being identified as representing the handwritten letters; receive a second freeform inking input directed to the map; based on the second freeform inking input, create a second freeform ink note; evaluate the second freeform ink note to identify the second freeform ink note as representing a real-world path; associate the second freeform ink note with second location data defining the real-world path; associate the second freeform ink note with a second annotation displayable on the map; where the second annotation is associated with a second location parameter defining a second map location at which the second annotation is displayed on the map, the second map location corresponding to the real-world path associated with the second freeform ink note; where the second annotation is associated with a second orientation parameter defining an orientation-agnostic behavior based on the second freeform ink note being identified as representing the real-world path; while the map is displayed with a first orientation relative to the display, display the first annotation representing the first freeform ink note and the second annotation representing the second freeform ink note with a first annotation orientation; and while the map is displayed with a second orientation relative to the display, the second orientation different from the first orientation, display the first annotation with a second annotation orientation, the second annotation orientation pivoted about the first map location relative to the first annotation orientation, and display the second annotation with the first annotation orientation.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
a display;
a logic machine; and
a storage machine holding instructions executable by the logic machine to:
display a map via the display;
associate a note with location data defining a geographic location;
associate the note with an annotation displayable on the map;

where the annotation is associated with a location parameter defining a map location at which the annotation is displayed on the map, the map location corresponding to the geographic location associated with the note;

where the annotation is associated with a zoom parameter defining one or more map zoom levels at which the annotation is displayed on the map;

where the annotation is associated with a context parameter defining one or more computing device contexts with which the annotation is displayed on the map; and present a notification corresponding to the note based on detecting that a distance between a current geographic location of the computing device and the geographic location associated with the note has decreased to below a threshold.

2. The computing device of claim 1, where the note is a computer file.

3. The computing device of claim 2, where the note is opened based on receiving user input at the annotation displayed on the map.

4. The computing device of claim 3, where the note is opened in an application external to the map.

5. The computing device of claim 1, where the note is text entered by a user of the computing device.

6. The computing device of claim 1, where the note is a freeform ink line drawn on the map.

7. The computing device of claim 6, where the annotation associated with the note is displayed on the map along with supplementary information, the supplementary information indicating a length of a real-world path represented by the freeform ink line.

8. The computing device of claim 1, where the annotation is associated with an orientation parameter defining one of a plurality of annotation rotation behaviors, the plurality including an orientation-dependent behavior and an orientation-agnostic behavior.

9. The computing device of claim 8, where the orientation parameter associates the orientation-dependent behavior with an annotation pivot point around which the annotation rotates as an orientation of the map changes relative to the display.

10. The computing device of claim 1, where the context parameter includes one or more user-specified annotation categories.

11. The computing device of claim 1, where the location parameter further defines a particular step in a multi-step set of navigation directions, and the annotation is displayed on the map when the particular step is selected.

12. The computing device of claim 1, where multiple annotations are collectively represented as an annotation collection.

13. The computing device of claim 1, where the annotation is associated with a different map location based on receiving a relocation input at the annotation displayed on the map.

14. The computing device of claim 1, where a notification parameter associated with the note defines one or more computing device contexts with which the notification is presented.

15. A computing device, comprising:
a display;
a logic machine; and
a storage machine holding instructions executable by the logic machine to:
display a map via the display;

associate a first note with location data defining a first geographic location;

associate the first note with a first annotation displayable on the map, where the first annotation is associated with a first orientation parameter defining an orientation-dependent behavior;

associate a second note with location data defining a second geographic location;

associate the second note with a second annotation displayable on the map, where the second annotation is associated with a second orientation parameter defining an orientation-agnostic behavior;

display the map with a first orientation relative to the display such that the first annotation representing the first note and the second annotation representing the second note are displayed with a first annotation orientation; and display the map with a second orientation relative to the display, the second orientation different from the first orientation, such that the first annotation is displayed with a second annotation orientation, different than the first annotation orientation, and the second annotation is displayed with the first annotation orientation.

16. The computing device of claim 15, where the first annotation and the second annotation are associated with zoom parameters defining one or more map zoom levels at which the annotations are displayed on the map.

17. The computing device of claim 15, where the first annotation and the second annotation are associated with context parameters defining one or more computing device contexts with which the annotations are displayed on the map.

18. The computing device of claim 15, where the first orientation parameter associates the orientation-dependent behavior with an annotation pivot point around which the first annotation rotates as an orientation of the map changes relative to the display.

19. The computing device of claim 15, where the first note and the second note are freeform ink lines drawn on the map.

20. A computing device, comprising:
a display;
a logic machine; and
a storage machine holding instructions executable by the logic machine to:
display a map via the display;
receive a first freeform inking input directed to the map;
based on the first freeform inking input, create a first freeform ink note;
evaluate the first freeform ink note to identify the first freeform ink note as representing handwritten letters;
associate the first freeform ink note with first location data defining a geographic location;
associate the first freeform ink note with a first annotation displayable on the map;
where the first annotation is associated with a first location parameter defining a first map location at which the first annotation is displayed on the map, the first map location corresponding to the geographic location associated with the first freeform ink note;
where the first annotation is associated with a first orientation parameter defining an orientation-dependent behavior based on the first freeform ink note being identified as representing the handwritten letters;

receive a second freeform inking input directed to the map;

based on the second freeform inking input, create a second freeform ink note;

evaluate the second freeform ink note to identify the second freeform ink note as representing a real-world path;

associate the second freeform ink note with second location data defining the real-world path;

associate the second freeform ink note with a second annotation displayable on the map;

where the second annotation is associated with a second location parameter defining a second map location at which the second annotation is displayed on the map, the second map location corresponding to the real-world path associated with the second freeform ink note;

where the second annotation is associated with a second orientation parameter defining an orientation-agnostic behavior based on the second freeform ink note being identified as representing the real-world path;

display the map with a first orientation relative to the display such that the first annotation representing the first freeform ink note and the second annotation representing the second freeform ink note are displayed with a first annotation orientation; and display the map with a second orientation relative to the display, the second orientation different from the first orientation, such that the first annotation is displayed with a second annotation orientation, the second annotation orientation pivoted about the first map location relative to the first annotation orientation, and the second annotation is displayed with the first annotation orientation.

* * * * *